US009885937B2

(12) United States Patent
Yang et al.

(10) Patent No.: US 9,885,937 B2
(45) Date of Patent: Feb. 6, 2018

(54) DYNAMIC OPTICAL CROSSBAR ARRAY (75) Inventors: Jianhua Yang, Palo Alto, CA (US); Alexandre M. Bratkovski, Mountain View, CA (US); David A. Fattal, Mountain View, CA (US); Minxian Max Zhang, Mountain View, CA (US)

(73) Assignee: Hewlett Packard Enerprise Development LP, Houston, TX (US)

( * ) Notice: Subject to any disclaimer, the term of this patent is extended or adjusted under 35 U.S.C. 154(b) by 707 days.

(21) Appl. No.: 13/991,461

(22) PCT Filed: Jan. 7, 2011

(86) PCT No.: PCT/US2011/020543
§ 371 (c)(1),
(2), (4) Date: Jun. 4, 2013

(87) PCT Pub. No.: WO2012/094019
PCT Pub. Date: Jul. 12, 2012

(65) Prior Publication Data
US 2013/0250420 A1 Sep. 26, 2013

(51) Int. Cl.
*G02F 1/29* (2006.01)
*G02F 1/015* (2006.01)
*G02F 1/01* (2006.01)

(52) U.S. Cl.
CPC ............ *G02F 1/292* (2013.01); *G02F 1/015* (2013.01); *G02F 1/0121* (2013.01); *G02F 2001/0155* (2013.01); *G02F 2201/307* (2013.01); *G02F 2203/12* (2013.01); *G02F 2203/22* (2013.01); *G02F 2203/62* (2013.01)

(58) Field of Classification Search
CPC .......... G02B 5/18–5/1895; G02F 1/015; G02F 2001/0151–2001/0159
USPC .................. 359/237–324, 558–590; 250/237
See application file for complete search history.

(56) References Cited

U.S. PATENT DOCUMENTS

| 3,664,726 A | 5/1972 | Mattis |
| 7,193,267 B2 | 3/2007 | Hsu et al. |
| 2004/0120246 A1 | 6/2004 | Park |
| 2005/0018275 A1 | 1/2005 | Harrison et al. |
| 2009/0072246 A1 | 3/2009 | Genrikh et al. |
| 2010/0078620 A1 | 4/2010 | Xi et al. |

(Continued)

FOREIGN PATENT DOCUMENTS

| JP | 2001-257396 | 9/2001 |
| KR | 2004-0056274 | 6/2004 |

OTHER PUBLICATIONS

Cavalleri, A., et al.; "Evidence for a Structurally-driven Insulator-to-metal Transition in Vo2: a View From the Ultrafast Timescale"; http://arxiv.org/ftp/cond-mat/papers/0403/0403214.pdf.

(Continued)

*Primary Examiner* — Bumsuk Won
*Assistant Examiner* — Jeffrey Madonna
(74) *Attorney, Agent, or Firm* — Fabian VanCott (57) ABSTRACT A dynamic optical crossbar array includes a first set of parallel transparent electrode lines, a bottom set of parallel electrode lines that cross said transparent electrode lines, and an optically variable material disposed between said first set of transparent electrode lines and said bottom set of electrode lines.

13 Claims, 7 Drawing Sheets (56) References Cited

U.S. PATENT DOCUMENTS

| | | | | |
|---|---|---|---|---|
| 2010/0278474 A1* | 11/2010 | Beausoleil | ............ | H01S 5/1046 |
| | | | | 385/2 |
| 2010/0278479 A1* | 11/2010 | Bratkovski | ........ | G02B 6/12007 |
| | | | | 385/31 |
| 2010/0302625 A1* | 12/2010 | Li | ............................ | G01D 5/30 |
| | | | | 359/319 |
| 2015/0219855 A1* | 8/2015 | Robson | ................ | H05K 1/0292 |
| | | | | 385/16 |
| 2015/0293428 A1* | 10/2015 | Ben-Abdallah | ....... | G02F 1/0147 |
| | | | | 250/504 R |
| 2015/0349006 A1* | 12/2015 | Wehner | ............. | H01L 27/14609 |
| | | | | 250/208.1 |

OTHER PUBLICATIONS

Driscoll, T., et al.; "Phase-transition Driven Memristive System"; American Institute of Physics; 2009; http://physics.ucsd.edu/~diventra/VO2memristorpubfinal.pdf.

PCT International Search Report, Sep. 30, 2011, PCT Application No. PCT/US2011/020543.

Perez, J., et al.; "The Metal—Insulator Transition in NdNi1—xCuxO3 Perovskites"; Journal of Physics: Condensed Matter;1996; vol. 8; No. 49; http://iopscience.iop.org/0953-8984/8/49/028.

F.A. Chudnovskii et al., "Electroforming and Switching in Oxides of Transition Metals; The Role of Metal-Insulator Transition in the Switching Mechanism," Journal of Solid State Chemistry 122, Feb. 1996, pp. 95-99, Article No. 0087, Academic Press, Inc.

* cited by examiner

With a voltage source, apply a voltage to one of a set of transparent electrode lines and one of a set of electrode lines crossing the transparent electrode lines, an optically variable material being disposed between the transparent electrode lines and the second electrode lines
(block 702)

With a control module, adjust the voltage to change a state of the optically variable material at crosspoints of the transparent electrode lines and the second electrode lines such that optical properties of the optically variable material at the crosspoints are altered
(block 704)

*Fig. 7*

DYNAMIC OPTICAL CROSSBAR ARRAY

BACKGROUND

Optical gratings are used in a wide variety of optical applications such as monochromators, spectrometers, wavelength division multiplexing, and various optical storage technologies. An optical grating is a periodic structure that diffracts light in multiple directions. One way to form an optical grating is to create a number of slits into a structure. This type of optical grating is referred to as a transmissive grating. Another way to form an optical grating is to create small regions of reflective material. This type of optical grating is referred to as a reflective grating.

An incident plane wave of light onto an optical grating structure will cause the light coming out of the structure to behave as a light source at either the slits or reflective regions. For example, with a reflective grating, the light being reflected off of the grating will behave as if the reflective material was a light source. Thus, the light being reflected will disperse in all directions. The angle of the incident light as well as the spacing between the narrow slits or reflective regions will affect the manner in which the grating system disperses the light.

An optical grating is typically a static structure. This is because the manner in which the optical grating disperses light is dependent upon the physical characteristics of the grating material. To affect the manner in which an optical grating system disperses light, the physical formation of the grating must be altered.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As mentioned above, an optical grating is typically a static structure. To affect the manner in which an optical grating system disperses light, the physical formation of the grating must be altered. In light of this and other issues, the present specification discloses methods and systems for a dynamic optical grating system.

According to certain illustrative examples, a grating system can be formed through use of a crossbar array. This crossbar array includes a first set of transparent electrode lines that intersect a bottom set of electrode lines. An optically variable material such as a Metal-Insulator Transition (MIT) material or a memristive material is then placed between these between these two sets of electrode lines.

Different voltage or current levels may be applied to the various electrode lines of the crossbar array. For example, a voltage applied between one of the transparent electrode lines and one of the bottom electrode lines will affect the physical properties of the optically variable material at the crosspoint between those two lines. Specifically, the voltage applied between those two lines will affect the reflectivity of the optically variable material at that crosspoint. For example, if the optically variable material is an MIT material, then while the MIT material is in an insulator state, it will be non-reflective. While the MIT material is in a conductive state, it will exhibit metallic like properties and become more reflective.

Through use of methods and systems embodying principles described herein, a reflective optical grating may be created with a crossbar array. Specifically, the crossbar array will form a two dimensional array of reflective crosspoints. Each of these crosspoints can be addressed separately and randomly. This allows the reflectivity of each of the crosspoints to by dynamically altered. The dynamic optical grating may then be used to perform a variety of different functions by reflecting light in different ways.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "bottom electrode" refers to an electrode on the opposite side of a transparent electrode. The term bottom does not impart any limitations of directions or orientation. Additionally, the term "electrical condition" refers to either a voltage or an electric current. Furthermore, the term "optically variable material" is to be broadly interpreted as a material capable of changing its optical properties such as reflectivity in response to an external stimulus such as an electrical condition. An optically variable material may be, for example, an MIT material or a memristive material.

Figure 1:
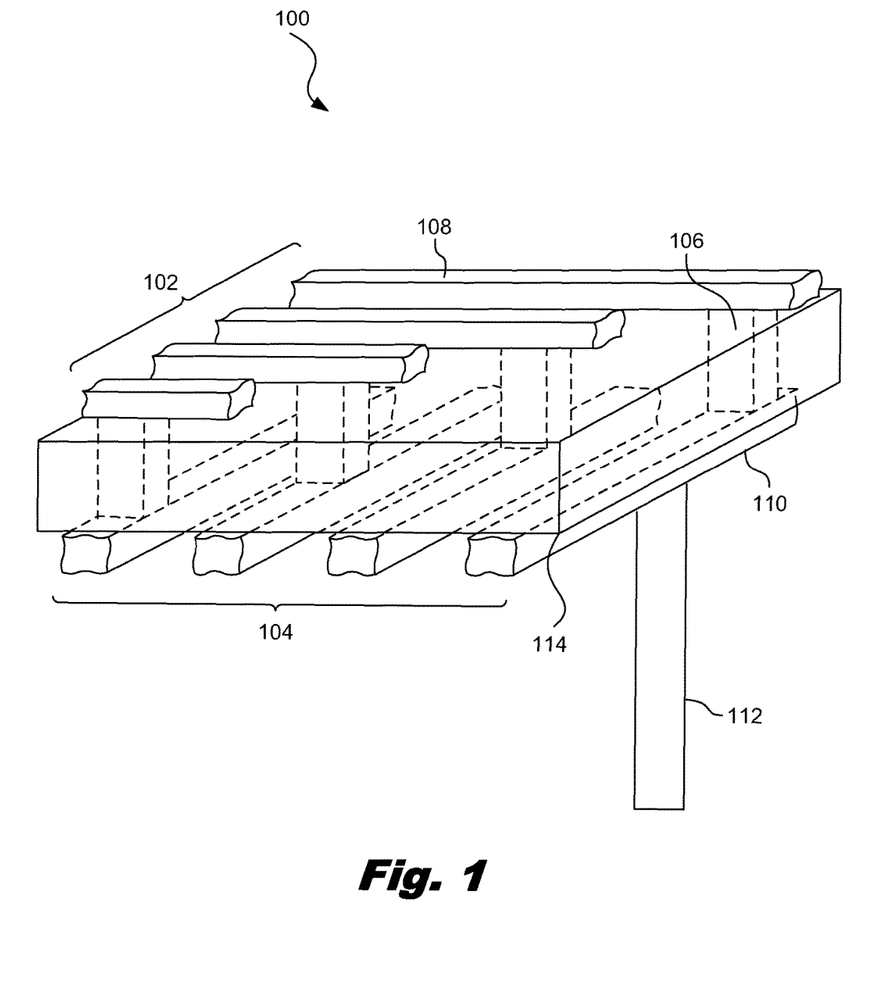
FIG. 1 is a diagram showing an illustrative crossbar array, according to one example of principles described herein.

FIG. 1 is a diagram showing an illustrative crossbar array (100). According to certain illustrative examples, the crossbar array (100) may include set of transparent electrode lines (102) which may generally be in parallel. Additionally, a set of bottom electrode lines (104) is generally perpendicular to, and intersects, the transparent electrode lines (102). An optically variable material (114) is disposed between the transparent lines (102) and the bottom electrode lines.

The intersection of each transparent electrode line and each bottom line are referred to as crosspoints (106). As will be described in more detail below, a voltage or current applied between a particular transparent electrode line (108) and a particular bottom electrode line (110) will affect the physical properties of the optically variable material (114) at the crosspoint (106) between those two lines (108, 110).

Although individual crossbar lines (108, 110) in FIG. 1 are shown with rectangular cross sections, crossbars may also have square, circular, elliptical, or more complex cross sections. The lines may also have many different widths, diameters, aspect ratios and/or eccentricities. The crossbars may be nanowires, sub-microscale wires, microscale wires, or wires with larger dimensions.

According to certain illustrative examples, the crossbar memory array (100) may be integrated into a Complementary Metal-Oxide-Semiconductor (CMOS) circuit or other conventional computer circuitry. Each individual electrode line may be connected to the CMOS circuitry by a via (112). The via (112) may be embodied as an electrically conductive path through the various substrate materials used in manufacturing the crossbar architecture. This CMOS circuitry can provide additional functionality to the memristive device such as input/output functions, buffering, logic, configuration, or other functionality. Multiple crossbar arrays can be formed over the CMOS circuitry to create a multilayer circuit.

Figure 2:
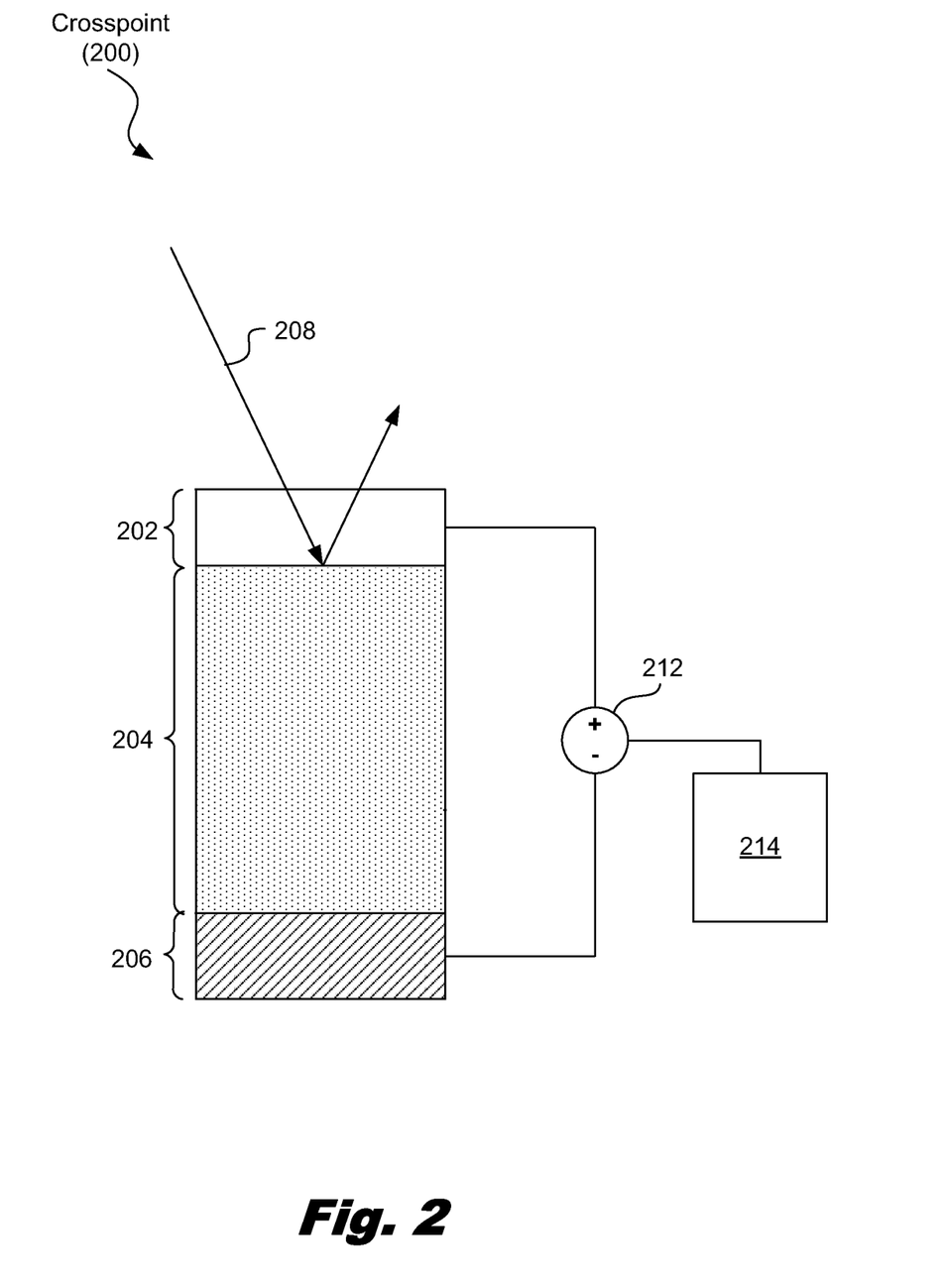
FIG. 2 is a diagram showing an illustrative dynamic optical device, according to one example of principles described herein.

FIG. 2 is a diagram showing an illustrative crosspoint of a dynamic optical grating. According to certain illustrative examples, the crosspoint includes a piece of MIT material (204) disposed between a transparent electrode (202) and a bottom electrode (206). A control module (214) is configured to apply a voltage (212) to the electrodes (202, 206) and thus to the MIT material (204) at a particular crosspoint (200).

The transparent electrode (202) may be made of a material such as doped zinc oxide (ZnO) or Indium Tin Oxide (ITO). Such a material with dopants is both optically transparent and electrically conductive. The bottom electrode (206) may be made of any electrically conductive material, whether it is transparent (suitable for transmissive gratings) or not transparent (suitable for reflective gratings).

Incident light will pass through the transparent electrode (202) and reach the MIT material. Depending on the state of the MIT material (204), the light will either be absorbed or reflected. Specifically, if the MIT material (204) is in a conductive state, then it will be more reflective, and thus a substantial portion of the incident light will be reflected. Alternatively, if the MIT material (204) is in a non-conductive state, then most of the light will be absorbed rather than reflected.

The characteristics of the MIT material (204) allow it to switch between a conductive state and a non-conductive state. This switching can be effected by the application of a voltage to the MIT material (204). In some cases, the switching can be initiated by the application of a current. This occurs when electric current injected between two electrodes connected to the MIT material locally heats the MIT material (204) above a transition temperature. The transition temperature is the temperature at which a solid material changes from one crystal state to another. This rise above the transition temperature causes current filamentation to occur. Current filamentation is an inhomogeneity in the current density distribution orthogonal to the direction of current flow. This current filamentation leads to current-controlled negative differential resistance (NDR).

In some cases, the switching can be initiated by a change in temperature. For example, a material may exhibit MIT characteristics at certain temperatures. The temperature of the MIT material (204) can be heated or cooled to initiate the NDR characteristics at the appropriate time. This change in temperature may be brought about through a variety of methods. One method, as mentioned above, is the application of an electric current. Furthermore, the MIT material (204) can be a variety of metal oxides including, but not limited to, vanadium oxide materials, iron oxide materials, niobium oxide materials, titanium oxide materials, tungsten oxide materials, strontium titanate materials and manganese oxide materials, and other transition metal oxides.

Figure 3:
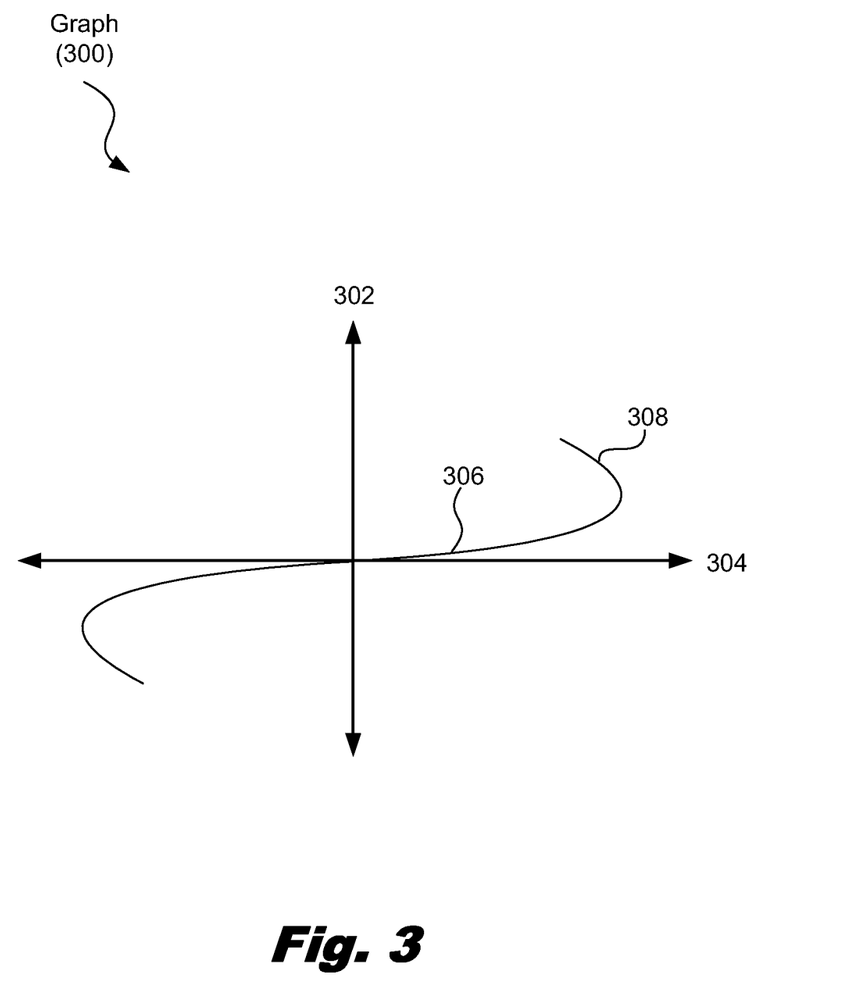
FIG. 3 is a graph showing illustrative characteristics of a metal-insulator transition material, according to one example of principles described herein.

FIG. 3 is a graph (300) showing illustrative characteristics of a metal-insulator transition material. The horizontal axis of the graph represents voltage (304) and the vertical axis of the graph represents electric current (302). According to certain illustrative examples, particular voltage and current levels will cause the MIT material to be in a non-conductive state (306) or a conductive state (308).

While in non-conductive state (306), a large change in voltage results in a small change in electrical current. At a certain point, where the current flowing through the MIT material causes the temperature of the material to rise past the transition temperature, the current will increase sharply. This will also cause a drop in voltage on the MIT material. At this point the MIT material becomes more conductive. Because there is a positive correlation between conductivity and reflectivity, the reflectivity of the MIT material will increase.

Figure 4A:
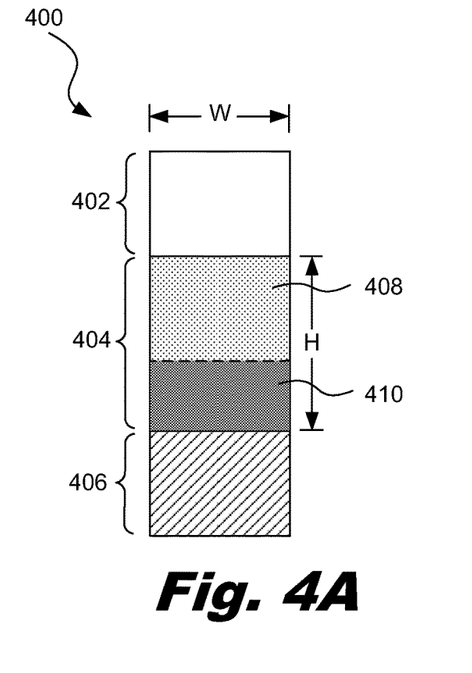
FIGS. 4A and 4B are diagrams showing an illustrative memristive crosspoint of a dynamic optical crossbar array, according to one example of principles described herein.
Figure 4B:
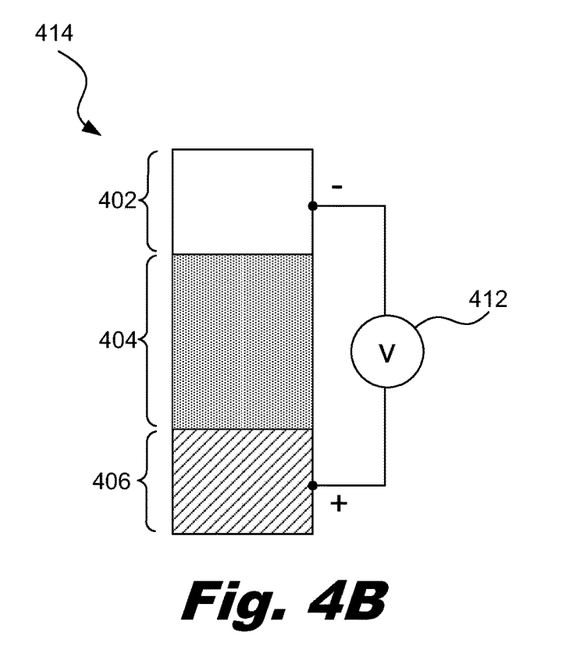

FIGS. 4A and 4B are diagrams showing an illustrative memristive crosspoint of a dynamic optical crossbar array. According to certain illustrative examples, the optically variable material at the crosspoints may include memristive material. Memristive material will allow the crosspoint to exhibit a "memory" of past electrical conditions. For example, a memristive device may include a matrix material which contains mobile dopants. These dopants can be moved within a matrix to dynamically alter the electrical operation of an electrical device. By dynamically altering the electrical properties, the optical properties will be changed as well.

FIG. 4A illustrates one potential "as manufactured" state of the memristive crosspoint device (400). The semiconducting region (408) has very few dopants and prevents electrical current from flowing between the two electrodes (402, 406). The reflectivity of the semiconducting region in this state is relatively small. The secondary region (410) is conductive and serves as a source of dopants which can be moved into the semiconducting region (408) to change the overall electrical conductivity of the memristive matrix (402). Consequently, in the "as manufactured" state of the memristive device illustrated in FIG. 2A, the memristive device (400) is a high resistive state.

The memristive matrix (402) has a height of "H" and a width of "W" as shown in FIG. 4A. For purposes of illustration only, assume that the height "H" is 100 nanometers and the width "W" is approximately 50 nanometers or less. A relatively intense electric field can be generated across the thin film of memristive matrix by a relatively small voltage. For example, a dopant may require an electric field intensity of 100,000 volts per centimeter to move within the matrix. If the distance between two electrodes is 100 nanometers, a voltage bias of only 1 Volt applied across the first electrode (404) and the second electrode (406) will produce the required electric field intensity of 100,000 volts/centimeter through the memristive material (404). The application of a programming voltage above a certain threshold allows the dopants to be moved through the memristive matrix (404).

FIG. 4B is a diagram showing the memristive device (414) with a programming voltage (412) applied. The programming voltage (412) results in an electric field which facilitates not only the movement of dopants from the highly doped secondary region (410) into the semiconducting region (408) and also the creation of some native dopants, such as oxygen vacancies, via an electro-reduction process in oxide memristive materials. In this state, the memristive matrix bordering the transparent electrode becomes more reflective.

A dynamic optical crossbar array that makes use of memristive material at the crosspoints will be able to change the reflectivity values at each crosspoint and have that value remain even after a voltage or current is no longer applied. Thus, the dynamic optical crossbar array using memristive materials is non-volatile.

Figure 5:
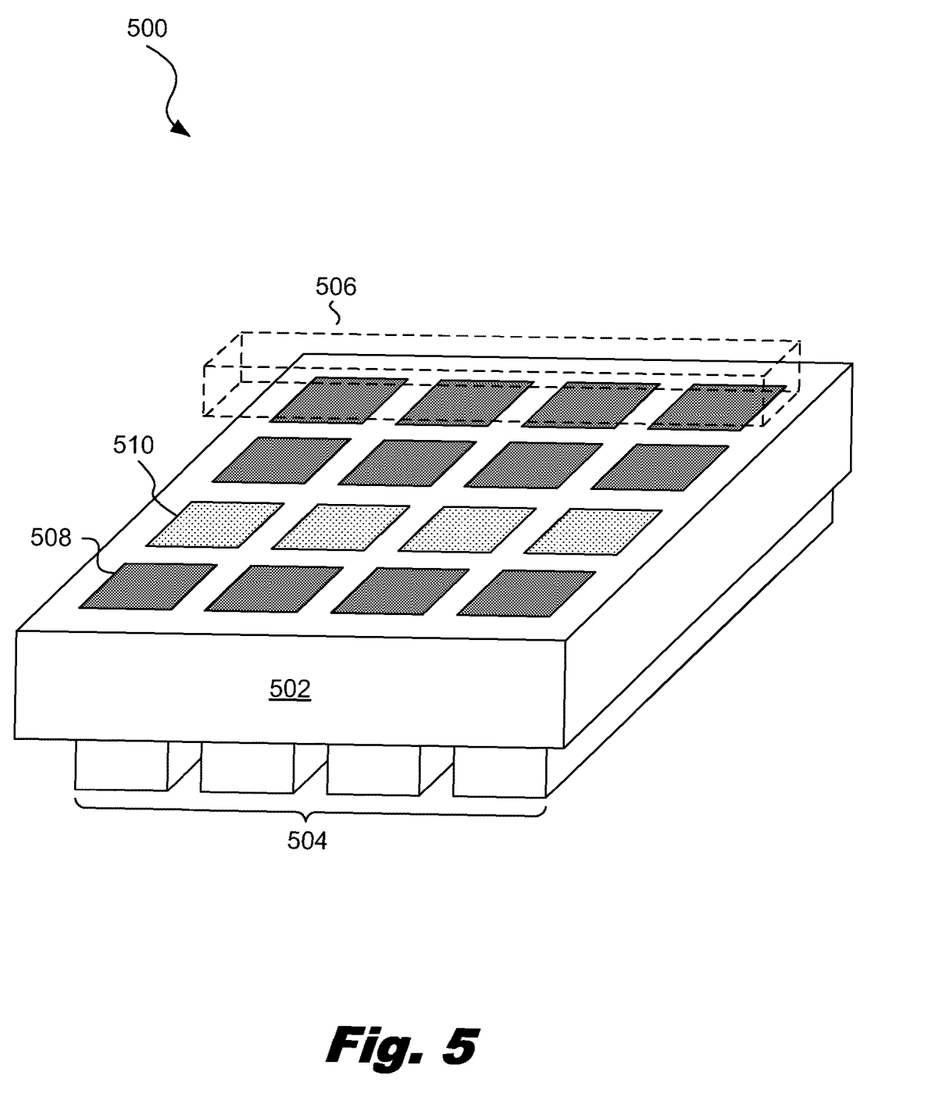
FIG. 5 is a diagram showing an illustrative perspective view of a dynamic optical crossbar array, according to one example of principles described herein.

FIG. 5 is a diagram showing an illustrative perspective view of a dynamic optical crossbar array (500). As mentioned above, a dynamic optical crossbar array includes a first set of transparent electrodes (506) intersecting a bottom set of electrodes. An optically variable material (502) is then disposed between the two sets of electrodes (506, 504). To allow clearer illustration of the surface of the optically variable material, only one of the transparent electrodes (506) running horizontally along the top of the optically variable material (502) is shown.

According to certain illustrative examples, the optical crossbar array includes a two dimensional array of crosspoint regions (508, 510) on the surface of the optically variable material (502). A crosspoint region (508, 510) is a region along the surface of the optically variable material that is affected by the voltage applied to two crossing electrodes. These surface regions may be either reflective crosspoint regions (508) or non-reflective crosspoint regions (510). The crosspoint regions may also have a graded reflectivity. Furthermore, although the crosspoint region shapes are shown as squares, an embodiment of principles described herein may have crosspoint regions of any practical shape depending on the shape of the electrodes (504, 506).

According to certain illustrative examples, a control module can be configured to store an optical profile for the crossbar array. An optical profile will include a voltage setting for each crosspoint within the array. The voltage setting for each crosspoint will affect the reflectivity of the associated crosspoint region (508, 510) for that crosspoint. Using different reflectivity patterns along the surface of an optical crossbar array (500) allows for different optical applications. These optical patterns may be designed for either a volatile crossbar array using only an MIT material as well as a non-volatile crossbar array using memristive material at the crosspoints. Additionally, the reflectivity pattern of the crossbar array is dynamic and can be altered by changing the voltage levels applied at each of the crosspoints.

Figure 6:
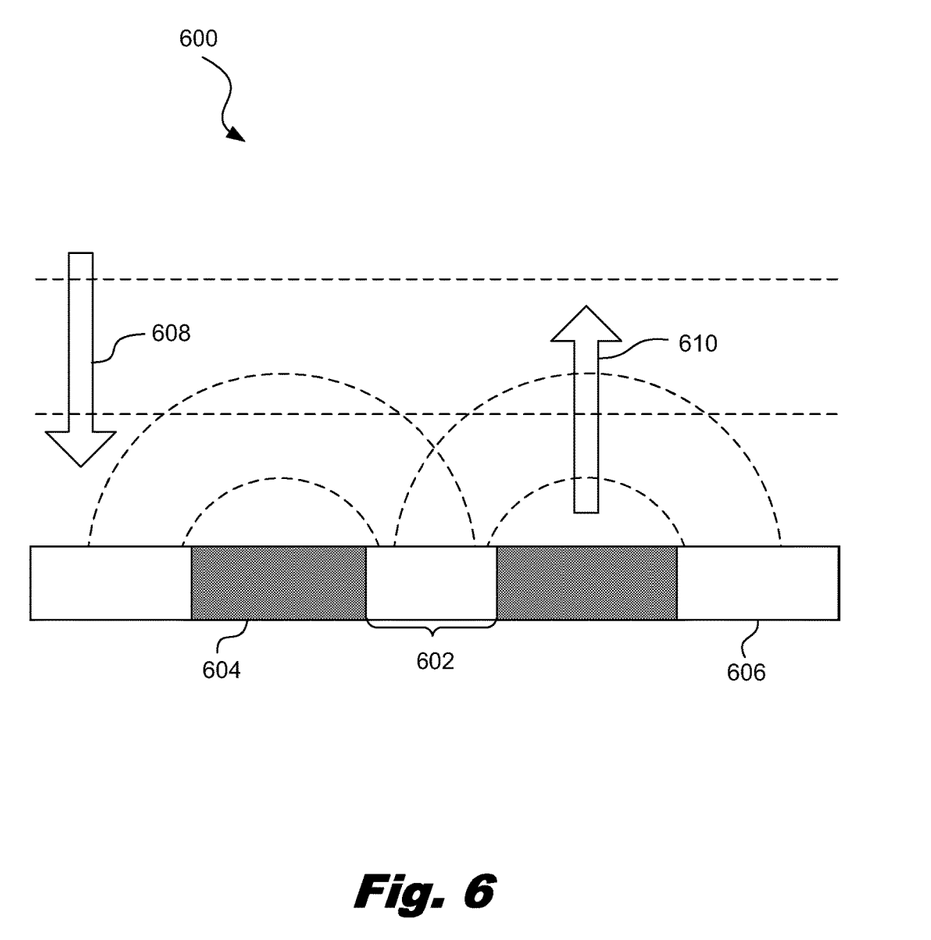
FIG. 6 is a diagram showing illustrative optical grating, according to one example of principles described herein.

FIG. 6 is a diagram showing illustrative optical grating (600). According to certain illustrative examples, a dynamic optical crossbar array can be used as a dynamic optical grating. As mentioned above, a reflective optical grating is one that includes a number of reflective regions within a non-reflective material. An optically variable material such as an MIT material is one that is normally non-reflective. However, as discussed above, application of electrical conditions such as a voltage to the optically variable material can create a reflective region within that material.

For illustrative purposes, a two-dimensional view is shown in FIG. 6. FIG. 6 illustrates what happens when a normally incident plane wave of light (608) hits the surface of the optical grating (600). As mentioned above, the reflective regions (604) behave as point sources of light. Therefore, the reflected light (610) is emitted in all directions. The distance between the reflective regions (604) will affect the characteristics of the light being reflected by the total number of reflecting regions. The exact theories relating to how the characteristics of the light are affected is beyond the scope of the present specification. Thus, a detailed description of such theories will not be given.

When constructing the dynamic optical crossbar array, the distance (602) between the crosspoint surface regions can be designed to have the desired effect on light being reflected from the array when the array is operating as an optical grating. For example, the distance between the crosspoint regions may correspond with a particular wavelength. Different wavelengths of light will appear as different colors to the human eye.

Figure 7:
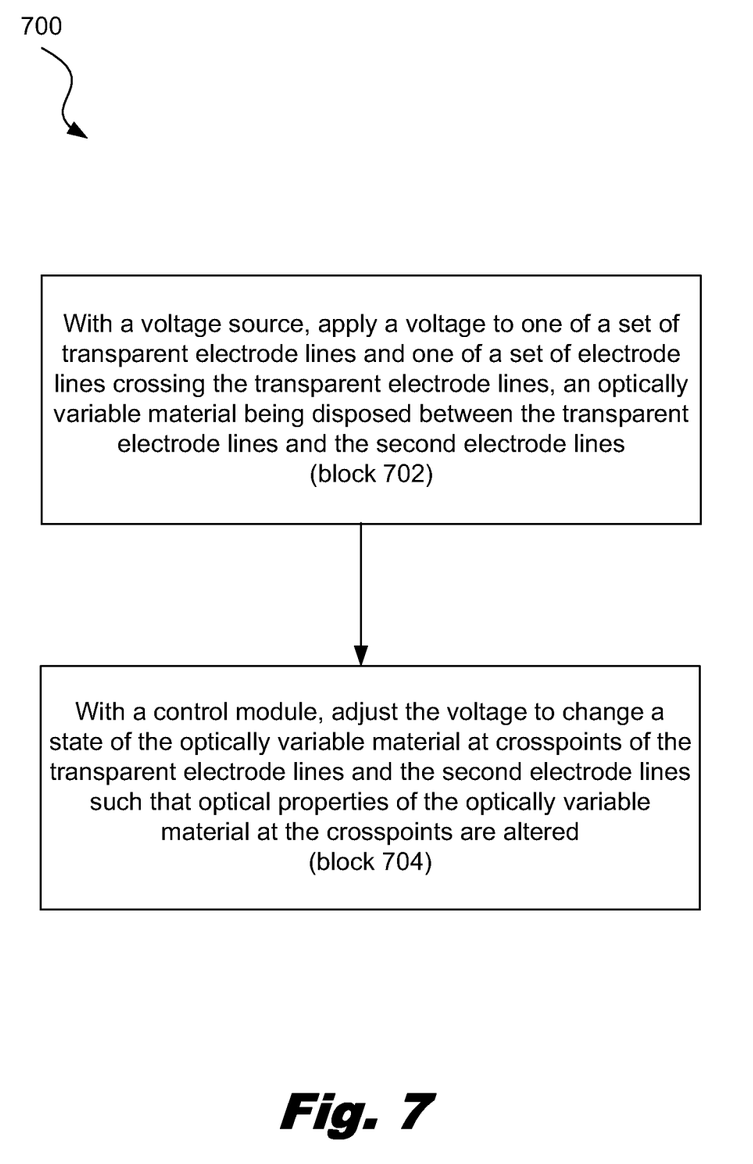
FIG. 7 is flowchart showing an illustrative method for operating a dynamic optical device, according to one example of principles described herein.

FIG. 7 is flowchart showing an illustrative method (700) for operating a dynamic optical device. According to certain illustrative examples, the method includes, with a voltage source, applying (block 702) a voltage to one of a set of transparent electrode lines and one of a set of electrode lines crossing the transparent electrode lines, an optically variable material being disposed between the transparent electrode lines and the bottom electrode lines. The method further includes, with a control module, adjusting (block 704) the voltage to change a state of the optically variable material at crosspoints of the transparent electrode lines and the bottom electrode lines such that optical properties of the optically variable material at the crosspoints are altered.

In conclusion, through use of methods and systems embodying principles described herein, a reflective optical grating may be created with a crossbar array. Specifically, the crossbar array will form a two dimensional array of reflective crosspoints. Each of these crosspoints can be addressed separately and randomly. This allows the reflectivity of each of the crosspoints to by dynamically altered. The dynamic optical grating may then be used to perform a variety of different functions by reflecting light in different ways.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A dynamic optical crossbar array comprising:
 a first set of parallel transparent electrode lines;
 a bottom set of parallel electrode lines that cross the transparent electrode lines; and
 an optically variable Metal-Insulator Transition (MIT) material disposed between the first set of transparent electrode lines and the bottom set of electrode lines,
 wherein the first set of parallel transparent electrode lines and the bottom set of parallel electrode lines are connected to an electrical condition source that, under control of a control module, selectively applies an electrical condition to crosspoints between the first set of parallel electrode lines and the bottom set of parallel electrode lines,
 the electrical condition causes local heating of the MIT material at the crosspoints above a transition temperature, and the MIT material undergoes a correlated change in reflectivity in response to the local heating above the transition temperature, the control module controls selective application of the electrical condition to a pattern of crosspoints that causes a surface of the crossbar array to operate as a reflective optical grating;

the electrical condition source is to maintain application of the electrical condition at the particular crosspoint to make the crosspoint reflective by local heating of the MIT material; and the electrical condition source is to stop application of the electrical condition at the particular crosspoint to make the crosspoint non-reflective.

2. The optical crossbar array of claim 1, in which the MIT material comprises a vanadium oxide material, a niobium oxide material, an iron oxide material, a manganese oxide material, a titanium oxide material, a tungsten oxide material, or a strontium titanate material.

3. The optical crossbar array of claim 1, further comprising the electrical condition source to selectively apply the electrical condition to a particular crosspoint between one of the transparent electrode lines and one of the bottom electrode lines.

4. The optical crossbar array of claim 3, further comprising the control module to adjust optical properties of the optically variable MIT material by adjusting the electrical condition applied at crosspoints within the optical crossbar array.

5. The optical crossbar array of claim 4, in which the control module stores an optical profile, the optical profile indicating an electrical condition level to be applied at each of the crosspoints.

6. A method for dynamic optical device operation, the method comprising:

applying, by an electrical condition source, an electrical condition to a set of transparent electrode lines and a set of bottom electrode lines crossing the transparent electrode lines, an optically variable Metal-Insulator Transition (MIT) material being disposed between the transparent electrode lines and the bottom electrode lines; and adjusting, by a control module, the electrical condition to cause local heating of the MIT material at a pattern of crosspoints of the transparent electrode lines and the bottom electrode lines and form a reflective optical grating according to the pattern of crosspoints, wherein local heating above a transition temperature of the MIT material causes a change of state of the optically variable MIT material at the crosspoints, and the change of state correlates to a change in optical properties of the optically variable MIT material at the crosspoints; and the adjusting includes:

maintaining the electrical condition at a level to render the MIT material reflective via local heating above a transition temperature, and ceasing application of the electrical condition to render the MIT material non-reflective.

7. The method of claim 6, further comprising storing, by the control module, an optical profile that indicates an electrical condition level to be applied at each of the crosspoints.

8. The method of claim 7, further comprising applying the electrical condition levels at each of the crosspoints in response to engaging the optical profile.

9. The method of claim 6, wherein the optical properties includes reflectivity.

10. The method of claim 6, wherein the MIT material includes a vanadium oxide material, a niobium oxide material, an iron oxide material, a manganese oxide material, a titanium oxide material, a tungsten oxide material, or a strontium titanate material.

11. A dynamic optical system comprising:
a crossbar array that includes:
a first set of parallel transparent electrode lines,
a bottom set of parallel electrode lines that cross the transparent electrode lines, and
a Metal-Insulator Transition (MIT) material disposed between the first set of transparent electrode lines and the bottom set of electrode lines;
a electrical condition source to selectively apply an electrical condition between the transparent electrode lines and the bottom electrode lines; and
a control module to:
adjust reflectivity of the MIT material at crosspoints between the transparent electrode lines and the electrode lines by adjusting the application of electrical conditions by the electrical condition source to cause local heating of the MIT material at the crosspoints above a transition temperature of the MIT material which causes correlated changes in reflectivity,
maintain the electrical condition at a level to render the MIT material reflective via local heating above a transition temperature;
cease application of the electrical condition to render the MIT material non-reflective; and
adjust the reflectivity at a pattern of crosspoints to form a reflective optical grating at a surface of the crossbar array.

12. The dynamic optical system of claim 11, wherein the MIT material includes a vanadium oxide material, a niobium oxide material, an iron oxide material, a manganese oxide material, a titanium oxide material, a tungsten oxide material, or a strontium titanate material.

13. The dynamic optical system of claim 11, wherein the control module is to store an optical profile indicating an electrical condition level to be applied at each of the crosspoints of the optical crossbar array.

* * * * *